United States Patent [19]

Burg et al.

[11] Patent Number: 5,039,741

[45] Date of Patent: Aug. 13, 1991

[54] TOUGHENED POLYOXYMETHYLENE AND SHAPED ARTICLES PRODUCED THEREFROM

[75] Inventors: Karlheinz Burg; Harald Cherdron, both of Wiesbaden; Friedrich Kloos, Mainz; Helmut Schlaf, Kelkheim, all of Fed. Rep. of Germany

[73] Assignee: Hoechst Aktiengesellschaft, Frankfurt am Main, Fed. Rep. of Germany

[21] Appl. No.: 488,495

[22] Filed: Mar. 2, 1990

Related U.S. Application Data

[63] Continuation of Ser. No. 715,871, Mar. 25, 1985, abandoned.

[30] Foreign Application Priority Data

Mar. 28, 1984 [DE] Fed. Rep. of Germany ....... 3411329
Feb. 18, 1985 [DE] Fed. Rep. of Germany ....... 3505524

[51] Int. Cl.$^5$ .............................................. C08L 51/04
[52] U.S. Cl. ........................................ 525/64; 525/57; 525/66; 525/69
[58] Field of Search ...................................... 525/64, 69

[56] References Cited

U.S. PATENT DOCUMENTS

| | | | |
|---|---|---|---|
| 3,642,940 | 2/1972 | Burg et al. | 525/64 |
| 3,749,755 | 7/1973 | Bronstert et al. | 525/64 |
| 4,296,216 | 10/1981 | Sakano et al. | 525/64 |
| 4,556,690 | 12/1985 | Nakagawa et al. | 525/64 |
| 4,639,488 | 1/1987 | Schuette et al. | 525/64 |

FOREIGN PATENT DOCUMENTS

| | | |
|---|---|---|
| 37686 | 10/1981 | European Pat. Off. . |
| 0079477 | 5/1983 | European Pat. Off. ............. 525/67 |
| 1193240 | 5/1965 | Fed. Rep. of Germany . |
| 1931392 | 4/1977 | Fed. Rep. of Germany . |
| 1964156 | 12/1977 | Fed. Rep. of Germany . |
| 2659357 | 7/1978 | Fed. Rep. of Germany . |

*Primary Examiner*—Jacob Ziegler

[57] ABSTRACT

The invention relates to a mixture composed essentially of polyoxymethylene (component A), a rubber-elastic graft copolymer in which the particles have been formed from a rubber-elastic, single-phase core based on polydiene and a hard graft shell (component B) and, if appropriate, a polymeric third component (component C). The invention also relates to a three-component mixture of the components A, B' and C, the core, in the case of B', being preponderantly or entirely composed of poly(meth)acrylic acid ester or silicone rubber instead of polydiene.

The shaped articles produced from these mixtures are particularly distinguished by good low-temperature impact strength.

11 Claims, No Drawings

TOUGHENED POLYOXYMETHYLENE AND SHAPED ARTICLES PRODUCED THEREFROM

This application is a continuation of application Ser. No. 06/715,871 filed Mar. 25, 1985, now abandoned.

Polyacetals have been employed as versatile materials for a long time, particularly in the industrial field. Because of their excellent mechanical properties, such as high stiffness, hardness and strength, and the fact that it is possible to produce moldings and shaped articles within narrow limits of tolerance, and their good resistance to many chemicals, they are frequently suitable for replacing metals. However, for a number of potential applications they have too low an impact strength, particularly notched impact strength, because of their relatively high glass temperature. For such fields of application it is also desirable that the products should retain their good impact strength properties even at low ambient temperatures.

A number of methods are known from the patent literature for improving the toughness of partly crystalline polymers which can be processed by thermoplastic means, by incorporating crosslinked or uncrosslinked elastomers, in some cases also grafted elastomers. The following may be mentioned as examples of polyoxymethylene: polyoxymethylene modified with polyurethanes (German Patent No. 1,193,240); polyoxymethylene modified with a 2-phase mixture of polybutadiene and styrene/acrylonitrile (ABS) (German Patent No. 1,931,392); polyoxymethylene modified with a graft copolymer prepared on an acrylic ester/butadiene basis (German Patent No. 1,964,156), a polyoxymethylene modified with a polydiene/polyalkylene oxide block polymer (German Patent No. 2,408,487) and finally a polyoxymethylene which has been treated with modified polysiloxanes or silicone rubbers (German Offenlegungsschrift 2,659,357). Admittedly the mixtures mentioned have improved toughness parameters at room temperature; however, the low-temperature impact strength, in particular, is not satisfactory for some purposes because of the relatively high glass transition temperature of the elastomer phase. Admittedly this does not apply to the mixtures of the German Offengungsschrift; however, the polysiloxanes or silicone rubbers employed here as the graft base are quite expensive. In some cases they or the toughening components obtained from them by grafting also contain halogen. The elimination of the latter in the form of hydrogen halide acids results in permanent damage to the polyoxymethylene matrix.

Impact-resistant mixtures of hard thermoplastics, a rubber-elastic elastomer and a component which promotes the distribution of the elastomer in the plastic matrix are known from EP Laid-open Specification 37,686. The elastomer component includes graft copolymers having a core-shell structure (inter alia MBS or ABS). Polyoxymethylene is not mentioned as the polymer matrix in this literature reference. The same also applies to EP Laid-open Specification 79,477, which relates to molding compositions of improved low-temperature impact strength composed of polyesters and a toughening component inter alia having a core-shell structure. The shell of particles of the toughening component can in this case be composed of several skins having different material compositions. The toughening component also contains polycarbonate as an essential constituent.

The object of the present invention was, therefore, to provide a toughened polyoxymethylene which, compared with systems hitherto known, possesses, at temperatures down to −40° C., considerably improved toughness parameters, without the original, advantageous properties of the polyoxymethylene, such as good resistance to weathering and ageing, high surface quality and advantageous processability by thermoplastic means being thereby appreciably impaired. In accordance with this object, low-cost, halogen-free toughening components should also be used.

It has now been found that this object can be achieved, surprisingly, by employing as the toughening component graft copolymers composed of a rubber-elastic, single-phase core having a polydiene base and a hard graft shell (core-shell structure).

The invention relates, therefore, to a mixture essentially composed of polyoxymethylene (component A) and 5–50% by weight, relative to the total mixture, of a rubber-elastic graft copolymer (component B) and, if appropriate, a polymeric third component (component C) and, if appropriate, customary additives, wherein the graft copolymer is present in the polyoxymethylene in a state of fine distribution and is composed of particles which have been formed from a rubber-elastic, single-phase core having a polydiene base and a hard graft shell.

The invention also relates to a mixture composed essentially of polyoxymethylene (component A), 5–50% by weight, relative to the total mixture, of a rubber-elastic graft copolymer (component B′) and a polymeric third component (component C), wherein the component B′ is composed of particles which have been formed from a rubber-elastic, single-phase core having a poly(meth)acrylic acid ester or silicone rubber base and a hard graft shell, the component B′ constituting, together with the component C, a two-phase system B′/C, and this two-phase system and the component B′, which can, if appropriate, also be present in addition, are present in a state of fine distribution in the polyoxymethylene.

Finally, the invention relates to shaped articles produced from mixtures of this type.

An essential characteristic of the mixtures according to the invention is the content of component B or B′, that is to say the rubber-elastic graft copolymer, the amount of which is, in general, between 5 and 50% by weight, preferably 10 and 40% by weight and particularly 10 and 30% by weight, relative to the total mixture. In accordance with the invention, component B is preferred to component B′.

The component B/B′ is composed, in accordance with the invention, of particles which predominantly, preferably to the extent of over 70%, have a core-shell (skin) structure. The core is formed from a rubber-elastic polymer phase onto which the hard shell, which can comprise several skins, has been grafted. In accordance with a further characteristic of the invention, the core should be single-phase, which means that it is composed predominantly, preferably entirely, of the rubber-elastic soft phase and contains inclusions of hard polymeric constituents of the shell only to a slight extent, preferably not at all. In general, the core makes up 40 to 95% by weight, preferably 60 to 90% and especially 70 to 80%, of the particles of the component B/B′; accordingly, the proportion of the shell (skins) is 5 to 60% by weight, preferably 10 to 40% by weight and especially 20 to 30% by weight.

In terms of materials, the core in the case of component B is composed of polymers based on polydienes, such as, for example, polybutadiene or polyisoprene. If appropriate, the core polymer can contain up to 10% by weight, preferably up to 5% by weight, of comonomer units. Preferably the comonomer is styrene or acrylonitrile. The core polymer is preferably crosslinked, the gel proportion (in toluene) being in general greater than 70%, preferably greater than 80%. An example of a suitable crosslinking agent is divinylbenzene.

The shell of particles of the component B is composed of hard polymers which have been grafted onto the core, i.e. the graft substrate. The shell can be formed as a single skin or as several skins, in particular as two skins, the various skins being composed of different polymers or copolymers in the event that there are several skins. In this case the first skin is preferably crosslinked, while the second skin and the optional further skins can be crosslinked.

The following may be mentioned here as examples of monomers which produce suitable polymers for the particle shell: methacrylonitrile; acrylonitrile; methacrylates in which the alcohol component has 1–4 carbon atoms, such as methyl methacrylate; acrylates derived from alcohols having 1–6 carbon atoms, such as ethyl acrylate, propyl acrylate or n-butyl acrylate; vinyl esters, such as vinyl acetate; vinyl ethers; N-vinyl-N-methylacetamide; and vinylpyrrolidone. Copolymers which are suitable for the construction of the shell are also copolymers formed from these monomers or copolymers formed from one or more of these monomers with styrene, α-methylstyrene or vinyl toluene. Mixtures of 20–80% by weight of acrylonitrile or methacrylonitrile and 80–20% by weight of the acrylates, methacrylates or vinyl compounds mentioned have proved particularly advantageous in this respect. Graft polymers which are also preferred as the component B are those in which the shell has been built up as two skins, the first skin being composed of polystyrene and the second (outer) skin being composed of poly(meth)acrylate which, in accordance with a further preferred embodiment is partially crosslinked. Crosslinking monomers which can be used here are polyfunctional monomers, such as, for example, ethylene glycol dimethacrylate or butylene glycol dimethacrylate or triallyl cyanurate.

The glass transition temperature of the component B, according to the invention, described above, should expediently be between $-40°$ C. and $-120°$ C., preferably below $-60°$ C. and, in particular, between $-80°$ C. and $-120°$ C.

The preparation of the graft copolymers having a core-shell structure which are employed in accordance with the invention as the component B is known and is effected either by single-stage polymerization in the case of a single-skin shell or by multi-stage polymerization in the case of a multi-skin shell. The latter procedure is described, for example, in U.S. Pat. No. 3,985,704. In both cases the graft copolymerization is carried out by means of water-soluble initiators or by means of activated initiator systems in which one component (the activator) is at least water-soluble (cf. in this respect C. B. Bucknall, "Toughened Plastics" page 98, Applied Science Publishers Ltd, 1977 (London)).

Both in single-stage and in multi-stage graft polymerization the starting material is a polydiene which is preferably present in the form of an aqueous latex of definite average particle size, preferably within the range from 0.1 to 5 μm, and which is preferably partially crosslinked.

For the preparation of the component B, the monomers or mixtures of monomers are polymerized in the presence of the polydiene, in the course of which a preponderant fraction of the monomers is grafted onto the polydiene particles. The amount of polydiene is generally 40 to 95% by weight and the amount of monomer (mixture) is 5 to 60% by weight, in each case relative to the total amount. The graft yield achieved varies between 60 and 95%, preferably between 80 and 90%. The graft polymerization is carried out in solution or emulsion, preferably in an aqueous dispersion. This is effected by initially taking the finely particulate polydiene latex, to which the customary polymerization auxiliaries, such as emulsifying or suspending agents, free radical initiators, regulators etc. have been added, adding the monomer or mixture of monomers and carrying out polymerization at temperatures between 30° and 95° C., preferably 50° to 80° C. In the case of a single-stage reaction the initiator is water-soluble; thus, for example, water-soluble peroxides, percarbonates or perborates are employed. In the case of a multi-component initiator system (redox system), at least one component must be water-soluble. The following may be mentioned as examples of emulsifiers (dispersing agents): aliphatic and aromatic sulfates; sulfonates; salts of carboxylic acids, such as salts of the Dresinate type; and the like.

In the case of the multi-stage reaction, which is preferred in accordance with the invention, the graft polymerization and the working up are carried out as described in U.S. Pat. No. 3,985,704. In this case a multi-skin shell is formed by first grafting a monomer, for example styrene, onto the core polymer, for example a butadiene-styrene copolymer, and then grafting on another monomer or mixture of monomers, if appropriate in the presence of a crosslinking agent.

The average particle size of the particles of the spray-dried component B is advantageously 20 to 250 μm, preferably 20 to 150 μm.

In the case of the component B', the core is composed in the first case preponderantly or entirely of poly(meth)acrylic acid esters, preferably partially crosslinked, the alcohol component in the ester containing, in general, 1 to 15 carbon atoms, preferably 1 to 8 carbon atoms. Suitable comonomers are olefinic monomers, such as butadiene, cyclooctadiene, vinyl ethers and halogenoalkyl acrylates. The gel fraction (in toluene) is preferably at least 50%, in particular at least 70%. As far as the graft shell is concerned, in principle the same monomers are suitable as those listed in the case of component B. The particle size of the component B' is also within the range described for component B. Graft polymers of this type, based on poly(meth)acrylic acid esters and the preparation thereof are described, for example, in German Auslegeschrift 1,964,156, German Offenlegungsschrift 2,116,653 and EP Laid-open Specifications 50,265, 60,601 and 64,207, to which reference is hereby expressly made.

In the second case, the core of the graft polymer is composed preponderantly or entirely of silicone rubber, this term being intended here also to embrace the uncrosslinked organopolysiloxanes. The appropriate monomers are then grafted onto these silicone rubbers, which preferably contain graft-active groups. Suitable monomers are those already disclosed in the case of component B. Graft polymers of this type, based on silicone rubber, and the preparation thereof are described in German Offenlegungsschrift 2,659,357, to which reference is also hereby expressly made.

The component C, which is optionally or preferably present in the mixture of the components A and B and is necessarily present, in accordance with the invention, in the mixture of components A and B', is a relatively low-melting substance which is readily miscible (diluent) in the melt with the component B/B'. Particularly good effects, which manifest themselves in an improvement of, in particular, the toughness properties compared with the two-component mixtures, are obtained if the component B/B' is so highly crosslinked that this component B/B' does not dissolve in the melt of the component C, a two-phase system therefore being formed and the surface tension of the system B/C or B'/C enabling a fine distribution of the component B/B' in the component C. In this two-phase system B/C or B'/C, the component B or B' is preferably predominantly in the peripheral regions and thus forms to a certain extent the skin of this two-phase system, whereas the core thereof is composed mainly of the component C. As the amount of the component B/B' increases, the latter is then increasingly located in the core of this two-phase system, and finally—in the case of appropriately large amounts—also outside the latter in the polymer matrix A. In the three-component mixtures according to the invention, both the two-phase system B/C or B'/C and the component B or B' which can, if appropriate, also be present in addition, are in a state of fine distribution in the polymer matrix A.

The morphology of three-component blends, in accordance with which the two-phase system composed of the components B/B' and C is in a state of fine distribution in the component A, the component B/B' being concentrated at the interface of the two-phase system, that is to say, as if it were concentrated between component A and C, is preferred in accordance with the invention. In this case B/B' evidently acts as a kind of "polymeric dispersing agent" for the component C in the polymer matrix A.

The melting point of the component C should, as a rule, be not more than 250° C., preferably 180° to 210° C. The amount is 10 to 95%, advantageously 30 to 70% and preferably 40 to 60%, relative to the sum of the components B or B' and C. The following may be mentioned here as examples of the component C: polyurethanes, segmented copolyesters and ethylene/vinyl acetate copolymers. These polymers are described, for example, in German Offenlegungsschrift 2,818,240, to which reference is hereby expressly made. Copolyether-ester-amides according to German Patent No. 2,523,991 form another example of this component C.

It is advantageous, but not absolutely necessary, first to mix the component C with the component B or B' and then to homogenize the premix thus obtained with the component A.

The base polymers (component A) employed in accordance with the invention are the known polyoxymethylenes, such as are described, for example, in German Offenlegungsschrift 2,947,490. These are essentially unbranched linear polymers containing, as a rule, at least 80%, preferably at least 90%, of oxymethylene units (—$CH_2O$—). The term polyoxymethylenes embraces in this case both homopolymers of formaldehyde or its cyclic oligomers, such as trioxane or tetroxane, and appropriate copolymers.

Homopolymers of formaldehyde or trioxane are polymers in which the hydroxyl end groups have been chemically stabilized in a known manner against degradation, for example by esterification or etherification.

Copolymers are polymers formed from formaldehyde or its cyclic oligomers, in particular trioxane, and cyclic ethers, cyclic acetals and/or linear polyacetals.

Suitable comonomers are a) cyclic ethers having 3, 4 or 5, preferably 3, ring members, b) cyclic acetals other than trioxane having 5-11, preferably 5, 6, 7 or 8, ring members and c) linear polyacetals, in each case in amounts of 0.1-20, preferably 0.5-10, % by weight. The most suitable copolymers are those formed from 99.5-95% by weight of trioxane and 0.5-5% by weight of one of the abovementioned co-components.

The values of reduced specific viscosity (RSV values) of the polyoxymethylene are, in general, 0.3-2.0 dl.g$^{-1}$, preferably 0.5-1.5 dl.g$^{-1}$ (measured in butyrolactone, stabilized with 2% by weight of diphenylamine, at 140° C. in a concentration of 0.5 g/100 ml) and the melt index values MFI 190/2, 16 are in most cases between 0.02 and 50 g.minute$^{-1}$. The crystallite melting point of the polyoxymethylene is within the range from 140° to 180° C., preferably 150°-170° C.; its density is 1.38-1.45 g.ml$^{-1}$, preferably 1.40-1.43 g.ml$^{-1}$ (measured as specified in DIN 53,479).

The mixture according to the invention can, if appropriate, also contain the known additives, such as stabilizers, nucleating agents, antistatic agents, light stabilizers, flame-retarding agents, strip agents, lubricants, plasticizers, pigments, dyestuffs, optical brighteners, processing auxiliaries and the like, the amount of which can be up to 50% by weight, relative to the total mixture.

Suitable stabilizers of the polyacetal phase against the effect of heat are, in particular, polyamides, amides of polybasic carboxylic acids, amidines, for example dicyandiamide, hydrazines, ureas, poly-(N-vinyllactams) and alkaline earth metal salts of aliphatic monobasic to tribasic carboxylic acids which preferably contain hydroxyl groups and have 2–20 carbon atoms, for example calcium stearate, calcium ricinoleate, calcium lactate and calcium citrate. The oxidation stabilizers used are, in particular, bisphenol compounds, preferably diesters of monobasic 4-hydroxyphenylalkanoic acids containing 7-13, preferably 7, 8 or 9, carbon atoms. It is advantageous in every case in order to obtain increased protection against oxidative attack on the graft copolymers (component B), to add sulfur-containing co-stabilizers, such as, for example, dilauryl $\beta,\beta'$-thiodipropionate, in addition to the customary diphenol compounds. In addition, systems based on diphenylamine or naphthylamine have proved to be outstanding oxidation stabilizers. Phenolic antioxidants, such as are described, for example, in Belgian Patent No. 853,844 or in EP Laid-open Specification 44,159, are also suitable for stabilizing the component B.

Examples of suitable light stabilizers are α-hydroxybenzophenone derivatives and benzotriazole derivatives.

The stabilizers are in most cases employed in a total amount of 0.1-5, preferably 0.5-3, % by weight (relative to the total molding composition).

Furthermore, the mixture according to the invention can also contain the customary fillers. The following may be mentioned as examples of these: filamentous reinforcing materials, such as glass fibers or carbon fibers; non-fibrous fillers, such as glass powder, graphite, carbon black, metal powders, metal oxides, silicates, carbonates and molybdenum (IV) sulfide. These fillers can be treated with an adhesion promoter or adhesion promoter system. The amount of filler is up to 50% by weight, preferably 5 to 40% by weight, relative to the total mixture. Preferably, however, the mixture according to the invention does not contain fillers.

The preparation of the mixtures according to the invention is effected by vigorously mixing the constituents at an elevated temperature, ie., in general, at temperatures above the melting point of the component A, that is to say at about 160° to 250° C., preferably between 180° and 220° C., in units having a good mixing action, such as, for example, Brabenders, extruders, preferably twin-screw extruders, or mixing rolls. Usually the components are first mixed mechanically in the form of powder at room temperature and are then melted in order to achieve complete homogenization. It has been found in this regard that the size and distribution of the elastomer particles in the matrix has a considerable effect on the mechanical properties of the mixture. The mixing of the components should, therefore, be effected in such a way that the component B/B' and/or the two-phase system B/C or B'/C are distributed as homogeneously as possible in the polymer matrix, and that the particle size of the particles of the component B/B' and/or of the two-phase system B/C or B'/C in the mixtures according to the invention is within the range between 0.1 and 5 μm, preferably between 0.2 and 1 μm.

The mixture according to the invention can be comminuted mechanically, for example by chopping or grinding, to give granules, chips, flakes or powders. It is thermoplastic and thus accessible to all the processing procedures typical of thermoplastic compositions. It can therefore be processed by injection molding, extrusion, melt spinning or deep-drawing to give shaped articles of any desired kind, and is suitable as an industrial material for the production of semifinished and finished components, such as shaped articles, for example tapes, rods, sheets, films, tubes and hoses and also parts of machines, for example casings, gearwheels, bearing components and control elements, and also automobile accessories, such as spoilers and the like.

The present invention is described in the following examples.

EXAMPLES

The parameters used for this purpose were determined as follows:

| MFI 190/2, 16: | As specified in DIN 53,735 |
| --- | --- |
| Notched impact strength, $a_k$: | As specified in DIN 53,453 on a standardized small bar |
| Damaging energy, $W_s$: | As specified in DIN 53,443 on 2 mm sheets |
| Yellowness index, G: | As specified in DIN 6,167 |
| Glass transition temperature, $T_g$: | On a DSC at a heat-up rate of 20°/min. |

The graft copolymers (component B) used in the examples were obtained by aqueous emulsion polymerization of the monomers or monomer mixtures mentioned in the examples, in the presence of the dispersed polybutadiene. The graft copolymers prepared in this manner, which, in accordance with the invention (Examples 1 to 8) had a core-shell structure, were spray-dried and mixed in a twin-screw extruder at varying weight ratios with polyoxymethylene of various melt viscosities. The composition temperature of the material being mixed was about 210° to 230° C. (casing temperature approx. 190° C.). The dried granules were injection molded in the customary way to give test specimens on which the values listed in the following Table were determined.

The following materials were employed:

COMPARISON EXAMPLE 1

Component A: Copolymer formed from trioxane and approx. 2% by weight of ethylene oxide, MFI 190/2.16 approx. 9.0.

Component B:—

COMPARISON EXAMPLE 2

Component A: Copolymer formed from trioxane and approx. 2% by weight of ethylene oxide, MFI 190/2.16 approx. 9.0

Component B: Polybutadiene "Diene 35 A" (Firestone) $T_g$: −75° C.

COMPARISON EXAMPLE 3

Component A: Copolymer formed from trioxane and approx. 2% by weight of ethylene oxide, MFI 190/2.16 approx. 9.0

Component B: Polybutadiene latex, average particle size approx. 0.1 μm, spray-dried and crosslinked; $T_g$: −76° C.

COMPARISON EXAMPLE 4

Component A: Copolymer formed from trioxane and approx. 2% by weight of ethylene oxide, MFI 190/2.16 approx. 9.0

Component B: Graft copolymer formed from 55 parts of polybutadiene and 45 parts of a mixture of 70% by weight of styrene and 30% by weight of acrylonitrile, average particle size 0.5 μm; $T_g$: −70° C. (Example 8 of German Patent 1,964,156)

EXAMPLE 1

Component A: Copolymer formed from trioxane and approx. 3.5% by weight of dioxolane, MFI 190/2.16 approx. 10.0.

Component B: Graft copolymer formed from 80 parts of polybutadiene and 20 parts of methyl methacrylate, average particle size 0.15 μm; $T_g$: −74° C.

The component B was prepared in the following way: 1,000 parts of a polybutadiene latex having a narrow particle size distribution and an average particle size of 0.15 μm were initially placed in a glass reactor under an inert gas. The solids content was 30% by weight and the pH was 10.0. When 10% by weight of the graft monomer had been added dropwise, the mixture was warmed to 70° C., 0.6 part of potassium persulfate was added and the mixture was stirred for 15 minutes at 70°. When the internal temperature had risen to 80° C., the remainder of the monomer was added dropwise in the course of 150 minutes, and, after 90 minutes, the mixture was kept at 80°. The resulting graft copolymer was obtained in the form of a finely particulate powder by spray drying.

EXAMPLE 2

Component A: Homopolymer of formaldehyde, MFI 190/2.16 approx. 9.0.

Component B: Graft copolymer formed from 80 parts of polybutadiene and 20 parts of methyl methacrylate, average particle size 0.2 μm; Tg: −74° C.

The component B was prepared by a method modelled on Example 1.

EXAMPLE 3

Component A: Copolymer formed from trioxane and approx. 2% by weight of ethylene oxide, MFI 190/2.16 approx. 9.0.

Component B: Multi-stage graft copolymer formed from 70 parts of polybutadiene and 30 parts of a two-skin graft shell composed of 60% by weight of polystyrene as the first graft shell and 40% by weight of polymethylmethacrylate as the second graft shell, average particle size 0.2 μm; Tg: −72° C.

The component B was prepared in the following way: 1,000 parts of a finely particulate polybutadiene latex were initially placed in a suitable reactor under inert conditions. The pH was adjusted to 9.0 with dilute acetic acid, and 10% by weight of the total amount of styrene were added. The mixture was then brought to 70° and, after 0.6 part of potassium persulfate had been added, kept at 70° for 15 minutes. When the polymerization had started, the remainder of the styrene was added dropwise in the course of 90 minutes. After about 1 hour, the internal temperature was raised to 80° and the methyl methacrylate, to which 1% by weight of ethylene glycol dimethacrylate had been added, was metered in over a period of 60 minutes. The mixture was then kept at 80° C. for a further 90 minutes. The resulting graft copolymer was obtained in the form of a finely particulate powder by spray drying.

EXAMPLE 4

Component A: Copolymer formed from trioxane, approx. 2.0% by weight of ethylene oxide and approx. 0.05% by weight of butanediol diglycidyl ether, MFI 190/2.16 approx. 1.0.

Component B: Graft copolymer formed from 70 parts of polybutadiene and 30 parts of a two-skin graft shell formed from 60% by weight of polystyrene and 40% by weight of polymethylmethacrylate, average particle size 0.2 μm; Tg: −71° C.

The component B was prepared by a method modelled on Example 3.

EXAMPLE 5

Component A: Copolymer formed from trioxane, approx. 2.0% by weight of ethylene oxide, MFI 190/2.16 approx. 2.5.

Component B: Graft copolymer formed from 70 parts of polybutadiene and 30 parts of a two-skin graft shell formed from 60% by weight of polystyrene and 40% by weight of polymethylmethacrylate, average particle size 0.2 μm; Tg: −72° C.

The component B was prepared by a method modelled on Example 3.

EXAMPLE 6

Component A: Copolymer formed from trioxane, approx. 3.5% by weight of dioxolane, MFI 190/2.16 approx. 9.0.

Component B: Graft copolymer prepared in accordance with Example I in U.S. Pat. No. 3,985,704.

EXAMPLE 7

Component A: Copolymer formed from trioxane, approx. 3.5% by weight of dioxolane, MFI 190/2.16 approx. 10.0.

Component B: Graft copolymer formed from 70 parts of polybutadiene and 30 parts of vinyl acetate, average particle size 0.3 μm; Tg: −69° C.

Component B was prepared by a method modelled on Example 1; the pH of the starting latex in this case was 7.0.

EXAMPLE 8

Component A: Copolymer formed from trioxane, approx. 2.0% by weight of ethylene oxide, MFI 190/2.16 approx. 9.0.

Component B: Graft copolymer formed from 80 parts of polybutadiene and 20 parts of N-vinylmethylacetamide, average particle size 0.25 μm; Tg: −72° C.

The component B was prepared by a method modelled on Example 1; the pH of the starting latex was 7.0 in this case.

EXAMPLE 9

Component A: Copolymer formed from trioxane, approx. 2.0% by weight of ethylene oxide, MFI 190/2.16 approx. 9.0.

Component B: Graft copolymer formed from 70 parts of polybutadiene and 30 parts of a two-skin graft shell formed from 60% by weight of polystyrene and 40% by weight of polymethylmethacrylate, average particle size 0.4 μm; Tg: −72° C.

Component C: Commercially available copolyetherester ("Hytrel" or "Arnitel") based on polytetramethyleneterephthalate, composed of recurring hard and soft segments, the amorphous, soft segments being composed of polytetramethylene-ether-glycol and the hard segments of butylene terephthalate. The Shore D hardness values were between 40 and 80.

The components B and C were homogenized in a twin-screw extruder to give a premix. The composition temperature was within the range from 200° to 230° C. After drying, the granules were then incorporated in polyoxymethylene in a second homogenization stage.

| Example | | Component B Polybutadiene content % by weight | % by weight | Notched impact strength $a_k$ (J/m²) 23° | −20° | −40° | Damaging energy Ws (J) 23° | −40° | Particle size of the component B in the mixture, μm | Yellowness index G |
|---|---|---|---|---|---|---|---|---|---|---|
| Comparison | 1 | — | — | 5.5 | 4.5 | 4.5 | 0.25 | 0.22 | — | −2.0 |
| Examples | 2 | 20 | 20 | 4.5 | — | — | 0.25 | — | 50 | +5.0 |
| | 3 | 20 | 20 | 5.0 | — | — | 0.30 | — | 20 | +7.0 |
| | 4 | 36 | 20 | 7.0 | 5.0 | 4.5 | 0.80 | 0.22 | 5−20 | −1.0 |
| Examples | 1 | 25 | 20 | 15.0 | 13.0 | 8.0 | 21.5 | 5.5 | 0.3−2 | −8.0 |
| | 2 | 25 | 20 | 16.0 | 14.5 | 7.5 | 23.0 | 4.5 | 0.2−3 | −7.5 |
| | 3 | 30 | 21 | 20.0 | 13.0 | 11.0 | 27.0 | 3.0 | 0.2−4 | −6.0 |

-continued

| | | | | | | | | | |
|---|---|---|---|---|---|---|---|---|---|
| 4 | 30 | 21 | 18.0 | 14.0 | 9.0 | 10.0 | 3.0 | 0.2-3 | −8.0 |
| 5 | 30 | 21 | 27.0 | 19.0 | 14.0 | 27.0 | 7.5 | 0.2-1 | −7.0 |
| 6 | 30 | 20 | 21.5 | 13.5 | 12.0 | 26.5 | 4.0 | 0.1-3 | −10.0 |
| 7 | 30 | 21 | 17.0 | 13.0 | 9.0 | 13.0 | 4.5 | 0.3-5 | ±0 |
| 8 | 25 | 20 | 19.0 | 12.0 | 8.0 | 22.0 | 7.0 | 0.3-4 | +1.0 |

| | COMPONENT | | | | | | | | Particle size (μm) of the component | | |
|---|---|---|---|---|---|---|---|---|---|---|---|
| | C % by weight | B % by weight | PB-content % by weight | | | | | | B | C | |
| 9 | 20 | 20 | 14 | 28.0 | 19.0 | 10.5 | 34.0 | 24.0 | 1.0-3.0 | 0.1-0.3 | +3.0 |

We claim:

1. A mixture comprised of polyoxymethylene (component A) and 5–50% by weight, relative to the total mixture, of a rubber-elastic graft copolymer (component B), wherein the graft copolymer is present in the polyoxymethylene in the form of a finely dispersed phase having an average particle size between 0.1 and 5 μm and consists essentially of particles which have been formed from a rubber-elastic, single-phase core consisting essentially of a polydiene base, which is cross-linked and has a gel content in excess of 70%, and a hard graft shell, said shell comprising a single layer or a plurality of layers.

2. A mixture as claimed in claim 1, wherein the core in the component B consists of polydiene.

3. A mixture as claimed in claim 1, wherein the shell of the particles in the component B consists essentially of a single layer, said single layer consisting essentially of polyacrylate, polymethacrylate, polyacrylonitrile, polymethacrylonitrile, or combinations thereof.

4. A mixture as claimed in claim 1, wherein the component B has a glass transition temperature below −60° C.

5. A shaped article produced from the mixture as claimed in claim 1.

6. A mixture as claimed in claim 1, wherein said shell consists essentially of a single layer.

7. A mixture as claimed in claim 1 consisting essentially of component A and component B.

8. A mixture as claimed in claim 1, wherein said shell comprises a plurality of layers.

9. A mixture as claimed in claim 8, wherein said shell consists essentially of two layers, an inner layer consisting essentially of crosslinked polystyrene and an outer layer consisting essentially of polyacrylate, polymethacrylate, polyacrylonitrile, or polymethacrylonitrile.

10. A mixture comprising:
   component A, a polyoxymethylene, having incorporated therein
   5–50% by weight, relative to the total mixture, of component B, a particulate mass finely distributed throughout component A, the particles of said particulate mass having an average particle size between 0.1 and 5 μm and consisting essentially of rubber-elastic, single phase cores having a polydiene base, which is cross-linked and has a gel content in excess of 70%, and a hard graft shell, said hard graft shell being essentially of the polydiene and up to 10% by weight of a co-polymerized styrene or acrylonitrile.

11. A mixture as claimed in claim 10, wherein the the copolymerized styrene or acrylonitrile is up to 5% by weight.

* * * * *

UNITED STATES PATENT AND TRADEMARK OFFICE
CERTIFICATE OF CORRECTION

PATENT NO. : 5,039,741

DATED : August 13, 1991

INVENTOR(S) : KARLHEINZ BURG, ET AL

It is certified that error appears in the above-identified patent and that said Letters Patent is hereby corrected as shown below:

In claim 10, column 12, line 33, insert --a single layer, said polydiene base consisting essentially-- after the word "essentially" and before the word "of".

Signed and Sealed this

Second Day of March, 1993

Attest:

STEPHEN G. KUNIN

*Attesting Officer*    *Acting Commissioner of Patents and Trademarks*